(12) United States Patent
Ejiri

(10) Patent No.: US 6,663,955 B2
(45) Date of Patent: Dec. 16, 2003

(54) MAGNETIC RECORDING MEDIUM

(75) Inventor: Kiyomi Ejiri, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/156,834

(22) Filed: May 30, 2002

(65) Prior Publication Data

US 2003/0064250 A1 Apr. 3, 2003

(30) Foreign Application Priority Data

May 31, 2001 (JP) ...................................... P.2001-164721

(51) Int. Cl.⁷ ............................................... G11B 5/706
(52) U.S. Cl. .................. 428/329; 428/336; 428/694 BH
(58) Field of Search ............................... 428/329, 336, 428/694 BH, 900

(56) References Cited

U.S. PATENT DOCUMENTS 6,017,605 A    1/2000   Yamazaki et al.

*Primary Examiner*—Stevan A. Resan
(74) *Attorney, Agent, or Firm*—Sughrue Mion, PLLC

(57) ABSTRACT

A magnetic recording medium is disclosed, comprising a support having thereon a magnetic layer which mainly comprises a ferromagnetic powder and a binder, wherein the magnetic recording medium is used in a magnetic recording reproduction system in which a recording signal is reproduced with a magnetic resistance type head (MR head), the ferromagnetic powder is a hexagonal magnetic ferrite powder having an average tabular diameter of from 10 to 40 nm, and the magnetic layer has a coercive force of 159 kA/m or more and has at most less than 1% of a component which performs magnetic flux revolution in a region of 80 kA/m or less in a differential curve of a remanence curve.

3 Claims, No Drawings

MAGNETIC RECORDING MEDIUM

FIELD OF THE INVENTION

The present invention relates to a coating type magnetic recording medium (i.e., a magnetic recording particulate medium) having high recording density, and particularly to a magnetic recording medium for high-density recording having a magnetic layer and a substantially non-magnetic lower layer, and containing ferromagnetic hexagonal ferrite in an uppermost layer.

BACKGROUND OF THE INVENTION

In the field of magnetic disks, 2-MB MF-2HD floppy disks using Co-modified iron oxide have come to be normally installed in personal computers. However, the capacity of data to be handled has today been rapidly increased, and accordingly, that capacity has become insufficient. It has therefore been desired that the capacity of floppy disks is increased.

Also in the field of magnetic tapes, with the recent spread of minicomputers, personal computers and office computers in work stations, the intensive research of magnetic tapes for recording computer data as external storage media (so-called backup tapes) has been conducted. Inputting the magnetic tapes for such applications to practical use, improvement in recording capacity has been eagerly desired, for an increase in recording capacity and miniaturization, coupled with miniaturization of computers and an increase in information processing ability.

Conventionally, magnetic recording media have been widely used in which a non-magnetic support is coated with a magnetic layer formed by dispersing iron oxide, Co-modified iron oxide, $CrO_2$, a ferromagnetic metal powder or a hexagonal ferrite powder in a binder. Of these, the hexagonal ferrite powder is known to be excellent in high-density recording characteristics. However, when inductive heads which have been mainly used in a system using flexible media are used, the fine hexagonal ferrite fine powder is low in saturation magnetization, resulting in failure to obtain a sufficient output. However, magnetic resistance type heads (i.e., Magneto Resistive Head: MR head) employed in hard disks begin to be also used in removal recording using flexible media as described above.

It is known that the MR heads are high in sensitivity, so that even the use of the hexagonal ferrite fine powder provides a sufficient reproduction output and a reduction in noise by which hexagonal ferrite is characterized gives high C/N ratio. For example, Japanese Patent Application (Laid-Open) No. 302243/1998 discloses an example of reproduction with an MR head using a fine barium ferrite (BaFe) powder.

However, in the fine hexagonal ferrite powder as known herein, thermal stability of magnetization is deteriorated with a decrease in the size of magnetic particles. This phenomenon becomes worse in a magnetic recording medium used in a system reproducing a recording signal having a recording density of 1 Gbit/inch$^2$ or more, and it has been expected that this problem is solved in the magnetic recording medium side.

SUMMARY OF THE INVENTION

An object of the present invention is to provide a coating type magnetic recording medium (i.e., a magnetic recording particulate medium) good in electromagnetic characteristics, particularly remarkably improved in C/N ratio in a high-density recording region, excellent in productivity, low in the price, and low in noise and excellent in high-density characteristics in a recording reproduction system in which an MR head is combined.

According to the present invention, there is provided a magnetic recording medium comprising a support and a magnetic layer formed thereon which mainly comprises a ferromagnetic powder and a binder, wherein the magnetic recording medium is used in a magnetic recording reproduction system in which a recording signal is reproduced with a magnetic resistance type head (MR head), the ferromagnetic powder is a hexagonal magnetic ferrite powder having an average tabular diameter of from 10 to 40 nm, and the magnetic layer has a coercive force of 159 kA/m (2000 Oe) or more and has at most less than 1% of a component which performs magnetic flux revolution in a region of 80 kA/m (1000 Oe) or less in a differential curve of a remanence curve.

Preferred embodiments of the present invention are as follows:

(1) The magnetic recording medium as described in the above item (1), wherein the average particle volume of the hexagonal magnetic ferrite powder is from 1000 to 10000 nm$^3$, and the existing ratio of particles having a tabular diameter of less than 10 nm is 10% or less;

(2) The magnetic recording medium as described in the above item (1), wherein the magnetic layer is from 0.03 to 0.20 μm; and (3) The magnetic recording medium as described in the above item (1), wherein a substantially non-magnetic layer is provided between the magnetic layer and the support.

DETAILED DESCRIPTION OF THE INVENTION

Although there is no particular limitation on a recording head for recording a signal on the magnetic recording medium of the present invention, an electromagnetic induction type thin film magnetic head such as an MIG head is suitably used. The hexagonal ferrite fine particles used in the magnetic layer of the present invention are tabular in form, and are required to control the average tabular diameter within the range of from 10 to 40 nm. Further, the coercive force of the magnetic layer is 159 kA/m (2000 Oe) or more, and the component which performs magnetic flux revolution in a region of 80 kA/m (1000 Oe) or less in a differential curve of a remanence curve is regulated little, thereby decreasing the influence of thermal fluctuation to improve the C/N ratio in high-density recording.

That is to say, in the magnetic recording medium of the present invention, the component which performs magnetic flux revolution in a region of 80 kA/m (1000 Oe) or less in a differential curve of a remanence curve is controlled so as to give at most less than 1%. Here, the remanence curve is drawn by applying a magnetic field of −800 kA/m (−10 kOe) in the direction parallel to a magnetic surface to saturate the magnetic layer, then, making the magnetic field zero, applying a magnetic field having the same distance in the reverse direction (for example, 8 kA/m (100 Oe)), followed by making the magnetic field zero, measuring the residual magnetic flux density (Br) for each case and the difference thereof, and plotting the difference of Br as the y-axis and the applied magnetic field as the x-axis. Further, "less than 1%" means the ratio of the area surrounded by a differential curve corresponding to 80 kA/mor less with the applied magnetic field as the X-axis and dy/dx as the Y-axis and the X-axis to the whole area of the differential curve and the X-axis.

In the present invention, as means for obtaining the above-described differential curve, it is preferred that a fine particle component present as a mixture in the hexagonal magnetic ferrite powder used in the magnetic layer is removed, for example, that the existing ratio of the particles having a tabular diameter of less than 10 nm in the hexagonal magnetic ferrite powder used is reduced to 10% or less.

Such means for removing the fine particle component include centrifugal separation.

In contrast with the present invention, even when the hexagonal magnetic ferrite powder has an average tabular diameter ranging from 10 to 40 nm, and the component which performs magnetic flux revolution in a region of 80 kA/m (1000 Oe) or less in a differential curve of a remanence curve (hereinafter referred to as the magnetic flux revolution component) is at most less than 1%, a coercive force of the magnetic layer of less than 159 kA/m (2000 Oe) results in failure to improve the C/N ratio. Further, even when the magnetic layer has a coercive force of 159 kA/m (2000 Oe) or more, and the hexagonal magnetic ferrite powder has an average tabular diameter ranging from 10 to 40 nm, 1% or more of the magnetic flux revolution component results in failure to improve the C/N ratio and overwrite erasing rate.

Further, in contrast with the present invention, even when the magnetic layer has a coercive force of 159 kA/m (2000 Oe) or more, and the magnetic flux revolution component is less than 1%, an average tabular diameter of the hexagonal magnetic ferrite powder exceeding 40 nm results in failure to improve the C/N ratio.

Still further, in contrast with the present invention, when the average tabular diameter of the hexagonal magnetic ferrite powder is less than 10 nm, it is difficult to obtain stable magnetic recording due to thermal fluctuation.

In the present invention, the magnetic layer has a coercive force of 159 kA/m (2000 Oe) or more, and it is preferred that the coercive force is as high as possible. However, the upper limit thereof is determined by a system to which the magnetic recording medium is applied, particularly by the saturation magnetization of the magnetic head for recording.

Areal recording density is represented by the product of line recording density and track recording density, and can be increased twice or more, compared to the recording density of DDS-4 commercially available at present. When the surface recording density is less than 1 Gbit/inch$^2$ (0.155 Gbit/cm$^2$), the object of the present invention can be achieved without the medium constitution of the present invention. On the other hand, when it exceeds 8 Gbit/inch$^2$ (1.24 Gbit/cm$^2$), it is difficult to achieve the object of the present invention even by the present invention.

In terms of improvement in resolution in overwrite and short wavelength recording, it is desirable to decrease the thickness of the magnetic layer. In particular, in the present invention, a reduction in noise is intended by decreasing the component which performs magnetic flux revolution at low magnetic field strength, so that erasing characteristics are deteriorated. It is therefore preferred that the magnetic layer is thinned. As specific means for thinning the magnetic layer, it is more preferred from the viewpoints of a decrease in surface roughness and improvement in productivity that the lower layer which is substantially non-magnetic is provided between the magnetic layer and the support, as conventionally known.

Details of the present invention will be described below.

[Magnetic Layer]

The magnetic recording medium of the present invention may be provided with the magnetic layer(s) either on one face or on both faces thereof. When the magnetic layer is provided on the lower layer, the magnetic layer (hereinafter also referred to as the upper layer or the upper magnetic layer) can be provided after coating of the lower layer, either while the lower layer is in the wet state (W/W) or after the lower layer has been dried (W/D). From the viewpoint of productivity, simultaneous or successive wet coating is preferred. However, in the case of a disk, coating after drying can also be sufficiently used. The multiple layer constitution of the present invention can form the upper layer and the lower layer at the same time by the simultaneous or successive wet coating (W/W), so that surface treatment such as calendering can be effectively utilized to improve the surface roughness of the upper magnetic layer even when it is an ultra-thin layer. The coercive force Hc of the magnetic layer is required to be 159 kA/m (2000 Oe) or more. In the magnetization distribution of the magnetic layer, the component which performs magnetic flux revolution by the applied magnetic field of 80 kA/m (1000 Oe) or less is specified to at most 1% or less, preferably 0.7% or less, and more preferably 0.5% or less.

[Ferromagnetic Powder]

The ferromagnetic powder used in the magnetic layer of the present invention is a hexagonal ferrite powder, which includes barium ferrite, strontium ferrite, lead ferrite and calcium ferrite and substitutes of their ferrite and a Co-substitutes. Specific examples thereof include magnetoplumbite type barium ferrite and strontium ferrite, magnetoplumbite type ferrite in which surfaces of particles are coated with spinel, and magnetoplumbite type barium ferrite and strontium ferrite partly containing spinel phases, and they may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb, in addition to the determined elements. In general, powders containing elements such as Co—Zn, Co—Ti, Co—Ti—Zr, Co—Ti—Zn, Ni—Ti—Zn, Nb—Zn—Co, Sb—Zn—Co and Nb—Zn can be used. Some contain specified impurities depending on the raw material and the process.

The average tabular diameter of the hexagonal magnetic ferrite powder means the mean of hexagonal tabular diameters, and it is from 10 to 40 nm, preferably from 10 to 35 nm and particularly preferably from 15 to 35 nm. In particular, when reproduction is carried out with an MR head in order to increasing track density, it is necessary to decrease noise, and the tabular diameter is preferably 35 nm or less. However, when it is less than 10 nm, stable magnetization can not be desired due to thermal fluctuation. Exceeding 40 nm results in high noise, which is unsuitable for the high-density magnetic recording of the present invention. The average tabular ratio (tabular diameter/tabular thickness) is desirably from 1 to 15, and preferably from 1 to 7. When the average tabular ratio is small, filling properties in the magnetic layer are preferably improved, but sufficient orientation is not obtained. Exceeding 15 results in an increase in noise caused by stacking between particles. Within this particle size range, the specific surface area of the particles measured by the BET method shows from 10 to 100 m$^2$/g. The specific surface area generally agrees with the arithmetically calculated value from the tabular diameter and tabular thickness of the particles. It is usually preferred that the distribution of the tabular diameter and tabular thickness of the particles is narrower. However, there is no particular limitation thereon, as long as the differential curve of the remanence curve in the present invention is satisfied. The numerical value can be compared by measuring 500 particles at random on a TEM photograph of the particles. Although the distribution is not normal distribution in many cases, the coefficient of variation (σ/average tabular diameter) represented by the standard deviation by calculation is usually from 0.1 to 2.0, preferably from 0.1 to 1.0, and more preferably from 0.1 to 0.5. In order to sharpen the particle size distribution, treatment for improving distribution is also applied to particles, as well as a particle formation reaction system is made as homogeneous as possible. Examples thereof include a method of selectively dissolving ultra-fine particles in an acid solution and a method using the above-described centrifugal separation. The average particle volume of the fine hexagonal ferrite powder is from 1000 to 10000, preferably from 1500 to 8000, and more preferably from 2000 to 8000.

The coercive force Hc measured for a magnetic material can be usually from about 40 to about 400 kA/m. Higher Hc is advantageous for high-density recording, but the capacity of a recording head is limited. In the present invention, the Hc of the magnetic material is from about 159 to about 397 kA/m, and preferably from 159 to 320 kA/m. When the saturation magnetization of the head exceeds 1.4 teslas, the Hc is preferably 175 kA/m or more. The Hc can be controlled by the particle size (tabular diameter and tabular thickness), the kind and amount of element contained, the site at which an element is substituted, and the conditions of particle formation reaction. The saturation magnetization σs is from 40 to 80 A·m$^2$/kg. The σs tends to be decreased as the particle size becomes finer. In order to improve the σs, it is well known that magnetoplumbite ferrite and spinel ferrite are compounded, or that the kind of element contained and the amount thereof added are selected. Further, the use of W type hexagonal ferrite is also possible. It is also carried out that surfaces of the particles are treated with a material suitable for a dispersing medium or a polymer when the magnetic material is dispersed. As surface treating materials, inorganic compounds and organic compounds are used. Typical examples of such compounds include oxides or hydroxides of Si, Al and P, and various kinds of titanium coupling agents. The amount thereof is from 0.1 to 10% based on magnetic material. The pH of the magnetic material is also important for dispersion. It is usually from about 4 to about 12, and has an optimum value depending on the dispersing medium and the polymer. Considering chemical stability and keeping quality of the magnetic material, a value ranging from about 6 to about 11 is selected. Water contained in the magnetic material also has an influence on dispersion. Although the water content has an optimum value depending on the dispersing medium and the polymer, a value ranging from 0.01 to 2.0% is usually selected. Methods for producing hexagonal ferrite include a glass crystallization method of mixing metal oxides providing barium oxide•iron oxide•iron with boron oxide as a glass-forming material so as to give a desired ferrite composition, followed by melting and rapid cooling to form an amorphous material, and then, heat treating it again, followed by washing and pulverization to obtain a crystalline barium ferrite powder, a water heat reaction method of neutralizing a barium ferrite composition metal salt solution with an alkali, removing by-products, and then, heating at 100° C. or more in a liquid phase, followed by washing, drying and pulverization to obtain a crystalline barium ferrite powder, and a co-precipitation method of neutralizing a barium ferrite composition metal salt solution with an alkali, and removing by-products, followed by drying, treatment at 1100° C. or less and pulverization to obtain a crystalline barium ferrite powder. However, any method may be used in the present invention.

[Non-magnetic Layer]

Detailed contents of the non-magnetic layer provided as the lower layer between the support and the magnetic layer will be described below. There is no limitation on the constitution of the lower layer, as long as the lower layer is substantially non-magnetic. However, the lower layer is usually composed of at least a resin, and is preferably a layer in which a powder such as an inorganic powder or an organic powder is dispersed in a resin. The inorganic powder is usually preferably a non-magnetic powder. However, a magnetic powder can also be used, as long as the lower layer is substantially non-magnetic.

The non-magnetic powder can be selected from inorganic compounds such as metal oxides, metal carbonates, metal sulfates, metal nitrides, metal carbides and metal sulfides. Examples of the inorganic compounds include α-alumina having an α-conversion of 90% or more, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide. They may be used either alone or in combination. Particularly preferred are titanium dioxide, zinc oxide, α-iron oxide and barium sulfate, because of their narrow particle size distribution and many function-imparting means, and more preferably are titanium dioxide and α-iron oxide. The particle size of these non-magnetic powders is preferably from 0.005 to 2 μm. However, inorganic powders different in particle size may be combined as needed, or the particle size distribution of a single non-magnetic powder may be widened to give a similar effect as described above. It is especially preferred that the particle size of the non-magnetic powders is from 0.01 to 0.2 μm. In particular, when the non-magnetic powders are granular metal oxides, the average particle size is preferably 0.08 μm or less, and when the non-magnetic powders are acicular metal oxides, the length in the long axis is preferably 0.3 μm or less, and more preferably 0.2 μm or less. The tap density is from 0.05 to 2 g/ml, and preferably from 0.2 to 1.5 g/ml. The water content of the non-magnetic powders is from 0.1 to 5% by weight, preferably from 0.2 to 3% by weight, and more preferably from 0.3 to 1.5% by weight. The pH of the non-magnetic powders is from 2 to 11, and particularly preferably from 5.5 to 10.

The specific surface area of the non-magnetic powders is from 1 to 100 m$^2$/g, preferably from 5 to 80 m$^2$/g, and more preferably from 10 to 70 m$^2$/g. The crystallite size of the non-magnetic powders is preferably from 0.004 to 1 μm, and more preferably from 0.004 to 0.1 μm. The oil absorption amount measured by the DBP (dibutyl phthalate) method is from 5 to 100 ml/100 g, preferably from 10 to 80 ml/100 g, and more preferably from 20 to 60 ml/100 g. The specific gravity is from 1 to 12, and preferably from 3 to 6. The shape thereof may be any of acicular, spherical, polyhedral and tabular forms. The Mohs' hardness is preferably from 4 to 10. The SA (stearic acid) adsorption of the non-magnetic powders is from 1 to 20 μmol/m$^2$, preferably from 2 to 15 μmol/m$^2$, and more preferably from 3 to 8 μmol/m$^2$. The pH is preferably between 3 and 6. Surfaces of these non-magnetic powders are preferably surface treated to allow $Al_2O_3$, $SiO_2$, $TiO_2$, $ZrO_2$, $SnO_2$, $Sb_2O_3$, ZnO or $Y_2O_3$ to exist. Particularly preferred for dispersing properties are $Al_2O_3$, $SiO_2$, $TiO_2$ and $ZrO_2$, and more preferred are $Al_2O_3$, $SiO_2$ and $ZrO_2$. They may be used either alone or in combination. Further, a surface treatment layer co-precipitated may be used depending on the purpose. A method of first allowing alumina to exist, and then treating a surface thereof with silica, or a reverse method thereof can also be employed. Further, although the surface treatment layer may be a porous layer depending on the purpose, it is generally preferred that the surface treatment layer is homogeneous and dense.

Specific examples of the non-magnetic powders used in the lower layers include Nanotite manufactured by Showa Denko K. K.; HIT-100 and ZA-G1 manufactured by Sumitomo Chemical Co., Ltd.; α-hematite DPN-250, DPN-250BX, DPN-245, DPN-270BX, DPN-500BX, DBN-SA1 and DBN-SA3 manufactured by Toda Kogyo Co., Ltd.; titanium oxide TTO-51B, TTO-55A, TTO-55B, TTO-55C, TTO-55S, TTO-55D and SN-100, and α-hematite E270, E271, E300 and E303 manufactured by Ishihara Sangyo Kaisha, Ltd.; titanium oxide STT-4D, STT-30D, STT-30 and STT-65C, and α-hematite α-40 manufactured by Titan Kogyo K. K.; MT-100S, MT-100T, MT-150W, MT-500B, MT-600B, MT-100F and MT-500HD manufactured by Teika Co., Ltd.; FINEX-25, BF-1, BF-10, BF-20 and ST-M manufactured by Sakai Chemical Industry Co., Ltd.; DEFIC-Y and DEFIC-R manufactured by Dowa Kogyo Co., Ltd.; AS2BM and $TiO_2$ P25 manufactured by Nippon Aerosil Co., Ltd.; 100A and 500A manufactured by Ube Industries, Ltd.; and burned products thereof. Particularly preferred non-magnetic powders are titanium dioxide and α-iron oxide.

Addition of carbon black to the lower layer can achieve a desired micro Vickers hardness, as well as a decrease in surface electrical resistance Rs and a decrease in light transmittance which are well-known effects. It is also possible to bring about the effect of lubricant storage by addition of carbon black to the lower layer. As for the kind of carbon black, furnace black for rubber, thermal black for rubber, coloring black and acetylene black can be used. The carbon black added to the lower layer should be optimized in the following characteristics depending on the effect desired, and the use of the carbon black gives the higher effect in some cases.

The specific surface area of the carbon black added to the lower layer is from 100 to 500 $m^2/g$, and preferably from 150 to 400 $m^2/g$, and the DBP oil absorption amount is from 20 to 400 ml/100 g, and preferably from 30 to 400 ml/100 g. The particle size of the carbon black is from 5 to 80 nm, preferably from 10 to 50 nm, and more preferably from 10 to 40 nm. The pH of the carbon black is preferably from 2 to 10, the water content is preferably from 0.1 to 10% by weight, and the tap density is preferably from 0.1 to 1 g/ml. Specific examples of the carbon black used in the present invention include BLACKPEARLS 2000, 1300, 1000, 900, 800, 880 and 700, and VULCAN XC-72 manufactured by Cabot; #3050B, #3150B, #3250B, #3750B, #3950, #950, #650B, #970B, #860B, MA-60, MA-230, #4000 and #4010 manufactured by Mitsubishi Kasei Corp.; CONDUCTEX SC, RAVEN 8800, 8000, 7000, 5750, 5250, 3500, 2100, 2000, 1800, 1500, 1255 and 1250 manufactured by Colombia Carbon; and Ketjen Black EC manufactured by AKZO. Carbon black used may be surface treated with a dispersing agent, grafted with a resin, or partly graphitized on surfaces of its particles. Further, the carbon black may be previously dispersed with a binder before it is added to a coating. The carbon black can be used within the range not exceeding 50% based on the above-described inorganic powder, and within the range not exceeding 40% based on the total weight of the non-magnetic layer. The carbon black can be used alone or in combination. For the carbon black which can be used in the present invention, reference can be made to, for example, "CarbonBlackBinran (Handbook of Carbon Black)" edited by Carbon Black Association.

The organic powder can also be added to the lower layer depending on the purpose. Examples thereof include acryl-styrene resin powders, benzoguanamine resin powders, melamine resin powders and phthalocyanine resin powders. Polyolefin resin powders, polyester resin powders, polyamide resin powders, polyimide resin powders and polyethylene fluoride resin powders can also be used. Methods described in Japanese Patent Application (Laid-Open) No. 18564/1987 and Japanese Patent Application (Laid-Open) No. 255827/1985 can be used for producing them.

Binder resins, lubricants, dispersing agents, additives, solvents, dispersing methods and the others for the lower layer can apply in those for the magnetic layer described below. In particular, with respect to the amount and kind of the binder resin, and the amounts added and kinds of the additive and the dispersing agent, techniques known in the art of magnetic layers can be applied.

[Binder]

Well-known thermoplastic resins, thermosetting resins, reactive resins and mixtures thereof are used as the binders used in the present invention. The thermoplastic resins include resins having a glass transition temperature of −100 to 150° C., a number average molecular weight of from 1,000 to 200,000, preferably from 10,000 to 100,000, and a degree of polymerization of from about 50 to about 1,000.

Examples of such resins include polymers and copolymers containing vinyl chloride, vinyl acetate, vinyl alcohol, maleic acid, acrylic acid, an acrylic ester, vinylidene chloride, acrylonitrile, methacrylic acid, amethacrylic ester, styrene, butadiene, ethylene, vinyl butyral, vinyl acetal and vinyl ether as constituent units; polyurethane resins; and various rubber resins. Further, the thermosetting resins or the reactive resins include phenolic resins, epoxy resins, hardenable polyurethane resins, urea resins, melamine resins, alkyd resins, reactive acrylic resins, formaldehyde resins, silicone resins, epoxy-polyamide resins, mixtures of polyester resins and isocyanate prepolymers, mixtures of polyester polyols and polyisocyanates, and mixtures of polyurethanes and polyisocyanates. These resins are described in detail in "Plastic Handbook" published by Asakura Shoten. It is also possible to use well-known resins of an electron beam hardenable type in each layer. Examples of these resins and methods for producing them are described in detail in Japanese Patent Application (Laid-Open) No. 256219/1987. The resins described above can be used either alone or in combination. Preferred examples thereof include a combination of at least one resin selected from the group consisting of a vinyl chloride resin, a vinyl chloride-vinyl acetate copolymer, a vinyl chloride-vinyl acetate-vinyl alcohol copolymer and a vinyl chloride-vinyl acetate-maleic anhydride copolymer, with a polyurethane resin, and a combination of them with a polyisocyanate.

As the polyurethane resins, there can be used well-known polyurethanes such as polyesterpolyurethanes, polyetherpolyurethanes, polyetherpolyesterpolyurethanes, polycarbonatepolyurethanes, polyesterpolycarbonatepolyurethanes and polycaprolactonepolyurethanes. For all of the binders shown herein, in order to obtain more excellent dispersibility and durability, it is desirable to use one in which at least one polar group selected from —COOM, —$SO_3M$, —$OSO_3M$, —P=O(OM)$_2$, —O—P=O (OM)$_2$ (with respect to the above, M represents a hydrogen atom, or an alkali metal salt group), OH, $NR_2$, $N^+R_3$ (wherein R represents a hydrocarbon group), an epoxy group, SH and CN is introduced by copolymerization or addition reaction, as needed. The amount of such a polar group is from $10^{-1}$ to $10^{-8}$ mol/g, and preferably from $10^{-2}$ to $10^{-6}$ mol/g.

Specific examples of these binders used in the present invention include VAGH, VYHH, VMCH, VAGF, VAGD, VROH, VYES, VYCN, VMCC, XYHL, XYSG, PKHH, PKHJ, PKHC and PKFE manufactured by Union Carbide; MPR-TA, MPR-TA5, MPR-TAL, MPR-TSN, MPR-TMF, MPR-TS, MPR-TM and MPR-TAO manufactured by Nissin Chemical Industry Co., Ltd.; 1000W, DX80, DX81, DX82, DX83 and 100FD manufactured by Denki Kagaku Kogyo K. K.; MR-104, MR-105, MR-110, MR-100, MR-555 and 400X-110A manufactured by Nippon Zeon Co., Ltd.; Nippolan N2301, N2302 and N2304 manufactured by Nippon Polyurethane Industry Co., Ltd.; Pandex T-5105, T-R3080 and T-5201, Barnock D-400 and D-210-80, and Crisvon 6109 and 7209 manufactured by Dainippon Ink & Chemicals, Inc.; Vylon UR8200, UR8300, UR8700, RV530 and RV280 manufactured by Toyobo Co., Ltd.; Daipheramin 4020, 5020, 5100, 5300, 9020, 9022 and 7020 manufactured by Dainichiseika Color & Chemicals Mfg. Co., Ltd.; MX5004 manufactured by Mitsubishi Kasei Corp.; Sunprene SP-150 manufactured by Sanyo Chemical Industries Co., Ltd.; and Salan F310 and F210 manufactured by Asahi Chemical Industry Co., Ltd.

The binder used in the non-magnetic layer or the magnetic layer is used in an amount ranging from 5 to 50% by weight, preferably from 10 to 30% by weight, based on non-magnetic powder or magnetic powder. When a vinyl chloride resin is used, it is preferably used in an amount of 5 to 30% by weight, and when a polyurethane resin is used, it is preferably used in an amount of 2 to 20% by weight. A polyisocyanate is preferably used in n amount of 2 to 20% by weight in combination with these resins. However, for example, when head corrosion occurs with a trace amount of chlorine released, it is also possible to use only the polyurethane or only the polyurethane and the polyisocyanate. In the present invention, when the polyurethane is used, a polyurethane having a glass transition temperature of −50 to 150° C., preferably 0 to 100° C., more preferably 30 to 90° C., a breaking elongation of 100 to 2000%, a breaking stress of 0.05 to 10 kg/mm$^2$ (0.49 to 98 MPa) and a yield point of 0.05 to 10 kg/mm$^2$ (0.49 to 98 MPa) is preferably used.

The magnetic recording medium of the present invention comprises two or more layers. It is therefore possible, of course, to vary the amount of the binder, the amount of the vinyl chloride resin, the polyurethane resin, the polyisocyanate or other resins contained in the binder, the molecular weight of each resin forming the magnetic layer, the amount of the polar group or the physical characteristics of the resins described above, in each layer as needed. They should be rather optimized in each layer. Techniques known in the art of multiple magnetic layers can be applied. For example, when the amount of the binder is varied in each layer, it is effective to increase the amount of the binder in the magnetic layer for a reduction in abrasion on a surface of the magnetic layer. In order to improve head touch to a head, the amount of the binder in the non-magnetic layer can be increased to give flexibility.

The polyisocyanates used in the present invention include isocyanates such as tolylene diisocyanate, 4,4'-diphenylmethane diisocyanate, hexamethylene diisocyanate, xylylene diusocyanate, naphthylene-1,5-diisocyanate, o-toluidine diisocyanate, isophorone diisocyanate and triphenylmethane triisocyante; reaction products of these isocyanates with polyalcohols; and polyisocyanates formed by condensation of isocyanates. These isocyanates are commercially available under the trade names of Coronate L, Coronate HL, Coronate 2030, Coronate 2031, Millionate MR and Millionate MTL manufactured by Nippon Polyurethane Co., Ltd.; Takenate D-102, Takenate D-110N, Takenate D-200 and Takenate D-202 manufactured by Takeda Chemical Industries, Ltd.; and Desmodule L, Desmodule IL, Desmodule N and Desmodule HL manufactured by Sumitomo Bayer Co., Ltd. They can be used either alone or as a combination of two or more of them, utilizing the difference in hardening reactivity, in each layer.

[Carbon Black and Abrasive]

In the present invention, furnace black for rubber, thermal black for rubber, coloring black and acetylene black can be used as carbon black in the magnetic layer. The specific surface area thereof is from 5 to 500 m$^2$/g, and the DBP oil absorption amount is from 10 to 400 ml/100 g. The average particle size is from 5 to 300 nm, preferably from 10 to 250 nm, and more preferably from 20 to 200 nm. The pH is preferably from 2 to 10, the water content is preferably from 0.1 to 10% by weight, and the tap density is preferably from 0.1 to 1 g/ml. Specific examples of the carbon black used in the present invention include BLACKPEARLS 2000, 1300, 1000, 900, 905, 800 and 700, and VULCAN XC-72 manufactured by Cabot; #80, #60, #55, #50 and #35 manufactured by Asahi Carbon Co., Ltd.; #2400B, #2300, #900, #1000, #30, #40 and #10B manufactured by Mitsubishi Kasei Corp.; CONDUCTEX SC, RAVEN 150, 50, 40, 15 and RAVEN-MT-P manufactured by Colombia Carbon; and Ketjen Black EC manufactured by Nippon EC. The carbon black may be surface treated with a dispersing agent, grafted with a resin, or partly graphitized on surfaces of its particles. Further, the carbon black may be previously dispersed with a binder before it is added to a magnetic coating. The carbon black can be used alone or in combination. The carbon black is preferably used in an amount of 0.1 to 30% by weight based on the magnetic material. The carbon black serves to provide antistatic properties to the magnetic layer, to reduce the coefficient of friction thereof, to give shading properties thereto, and to improve film strength thereof. These vary according to the kind of carbon black. It is therefore possible, of course, that the carbon black is properly used in the upper magnetic layer and the lower non-magnetic layer by changing the kind, amount and combination of the carbon black, based on the various characteristics described above such as the particle size, oil absorption amount, electric conductivity and pH, depending on the purpose. They should be rather optimized in each layer. For the carbon black which can be used in the magnetic layer of the present invention, reference can be made to, for example, "Carbon Black Binran (Handbook of Carbon Black)" edited by Carbon Black Association.

Abrasives used in the present invention include well-known materials having a Mohs' hardness of 6 or more such as α-alumina having an α-conversion of 90% or more, β-alumina, silicon carbide, chromium oxide, cerium oxide, β-iron oxide, corundum, artificial diamond, silicon nitride, titanium carbide, titanium oxide, silicon dioxide and boron nitride. They may be used either alone or in combination. Further, a composite material composed of abrasives (obtained by surface treating an abrasive with another abrasive) may be used. In some cases, these abrasives may contain some compounds or elements other than the main components. However, the effect is unchanged as long as the main components are contained in an amount of 90% or more. The particle size of these abrasives is preferably from 0.01 to 2 µm, more preferably from 0.05 to 1.0 µm, and particularly preferably from 0.05 to 0.5 µm. In particular, in order to improve electromagnetic characteristics, the narrower particle size distribution thereof is preferred. Further, in order to improve durability, it is also possible to combine abrasives different in particle size as needed, or to widen the particle size distribution of a single abrasive to give a similar effect as described above it is preferred that the abrasives have a tap density of 0.3 to 2 g/ml, a water content of 0.1 to 5% by weight, a pH of 2 to 11 and a specific surface area of 1 to 30 m$^2$/g. The shape of the abrasives used in the present invention may be any of acicular, spherical and die-like forms. However, a shape having an angle is preferred because of high abrasive quality. Specific examples thereof include AKP-12, AKP-15, AKP-20, AKP-30, AKP-50, HIT-20, HIT-30, HIT-55, HIT-60, HIT-70, HIT-80 and HIT-100 manufactured by Sumitomo Chemical Co., Ltd.; ERC-DMB, HP-DBM and HPS-DBM manufactured by Reynolds, WA 10000 manufactured by Fujimi Kenmazai Co., Ltd.; UB 20 manufactured by Uemura Kogyo Co., Ltd.; G-5, Clomex U2 and Clomex U1 manufactured by Nippon Chemical Industrial Co., Ltd.; TF 100 and TF 140 manufactured by Toda Kogyo Co., Ltd.; Beta Random Ultrafine manufactured by Ibiden Co., Ltd.; and B-3 manufactured by Showa Mining Co., Ltd. Each of these abrasives can also be added to the non-magnetic layer as needed. Addition thereof to the non-magnetic layer can control the surface shape and the state of the abrasive projected. The particle size and amount of the abrasive added to the magnetic layer or the non-magnetic layer should be established, of course, to optimum values.

[Additives]

In the present invention, additives having a lubricating effect, an antistatic effect, a dispersing effect or a plasticizing effect are each used in the magnetic layer or the non-magnetic layer. Examples of such additives include molybdenum disulfide, tungsten disulfide, graphite, boron nitride, fluorinated graphite, silicone oil, a polar group-containing silicone, a fatty acid-modified silicone, a fluorine-containing silicone, a fluorine-containing alcohol, a fluorine-containing ester, a polyolefin, a polyglycol, an alkyl phosphate and an alkali metal salt thereof, an alkyl sulfate and an alkali metal salt thereof, polyphenyl ether, phenylphosphonic acid, α-naphthylphosphoric acid, phenylphosphoric acid, diphenylphosphoric acid, p-ethylbenzenephosphonic acid, phenylphosphinic acid, an aminoquinone, a silane coupling agent, a titanium coupling agent, a fluorine-containing alkyl sulfate and an alkali metal salt thereof, a monobasic fatty acid having 10 to 24 carbon atoms (which may contain an unsaturated bond or may be branched) and a metal salt (such as Li, Na, K, or Cu) thereof, a monovalent, divalent, trivalent, tetravalent, pentavalent or hexavalent alcohol having 12 to 22 carbon atoms (which may contain an unsaturated bond or may be branched), an alkoxy alcohol having 12 to 22 carbon atoms, a mono-, di- or tri-fatty acid ester of a monobasic fatty acid having 10 to 24 carbon atoms (which may contain an unsaturated bond or may be branched) with a monovalent, divalent, trivalent, tetravalent, pentavalent or hexavalent alcohol having 2 to 12 carbon atoms (which may contain an unsaturated bond or may be branched), a fatty acid ester of a monoalkyl ether of an alkylene oxide polymer, a fatty acid amide having 8 to 22 carbon atoms, and an aliphatic amine having 8 to 22 carbon atoms.

Specific examples of the fatty acids include capric acid, caprylic acid, lauric acid, myristic acid, palmitic acid, stearic acid, behenic acid, oleic acid, elaidic acid, linolic acid, linolenic acid and isostearic acid. The esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate and ethylene glycol dioleyl, and the alcohols include oleyl alcohol, stearyl alcohol and lauryl alcohol. In addition, there can also be used nonionic surfactants such as an alkylene oxide-based compound, a glycerin-based compound, a glycidol-based compound and an alkylphenol-ethylene oxide adduct; cationic surfactants such as a cyclic amine, an ester amide, a quaternary ammonium salt, a hydantoin derivative, a heterocyclic compound, a phosphonium and a sulfonium; anionic surfactants containing acidic groups such as a carboxylic acid group, a sulfonic acid group, a phosphoric acid group, a sulfate group and a phosphate group; and amphoteric surfactants such as an amino acid, an aminosulfonic acid, a sulfate or a phosphate of an aminoalcohol, and an alkylbetaine. These surfactants are described in detail in "Kaimen Kasseizai Binran (Handbook of Surfactants)" published by Sangyo Tosho Co., Ltd. These lubricants and antistatic agents do not necessarily have apurity of 100%, and may further contain impurities such as isomers, unreacted products, by-products, decomposed products and oxidation products, in addition to the main components. The amount of these impurities is preferably 30% or less, and more preferably 10% or less.

These lubricants and surfactants used in the present invention each have different physical actions, and the kind and amount thereof and the ratio of the lubricant simultaneously used, which exerts an synergistic effect, should be optimally determined depending on the purpose. The following methods are applicable in this regard:

(1) The fatty acids different in melting point are used in the non-magnetic and magnetic layers, respectively, to control their bleeding to the surface;

(2) The esters different in boiling point, in melting point or in polarity are used in the non-magnetic and magnetic layers, respectively, to control their bleeding to the surface;

(3) The amount of the surfactant is adjusted to improve the stability of coating; and (4) The amount of the lubricant added is increased in an intermediate layer to improve a lubricating effect.

Of course, the use of the lubricants and surfactants is not limited to the examples shown above. In general, the total amount of lubricant is selected within the range of from 0.1 to 50%, preferably from 2 to 25%, based on the magnetic material or the non-magnetic powder.

All or a part of the additives used in the present invention may be added in any step of the production of the magnetic layer and the non-magnetic layer. For example, they can be mixed with the magnetic material before a kneading step, or can be added in a kneading step of the magnetic material, the binder and the solvent, in a dispersing step, after the dispersing step or just before coating. Further, all or a part of the additives are applied by the simultaneous or successive coating after coating of the magnetic layer depending on the purpose to attain the object in some cases. Further, according to the purpose, the surface of the magnetic layer can also be coated with the lubricant after calendering or after the conclusion of slitting. In the present invention, organic solvents known in the art can be used. For example, solvents described in Japanese Patent Application (Laid-Open) No. 68453/1994 can be used.

[Layer Constitution]

In the magnetic recording medium of the present invention, the thickness of the support is from 2 to 100 µm, and preferably from 2 to 80 µm. As the support for a computer tape, there is used a support having a thickness ranging from 3.0 to 6.5 µm (preferably from 3.0 to 6.0 µm, more preferably from 4.0 to 5.5 µm). The thickness of the magnetic layer is preferably from 0.03 to 0.20 µm, and more preferably from 0.05 to 0.15 µm. Less than 0.03 µm results in too a low reproduction output, whereas exceeding 0.20 µm causes deteriorated overwrite characteristics and resolution.

An undercoat layer may be provided between the support and the non-magnetic layer or the magnetic layer for improvement in adhesion. The thickness of the undercoat layer is from 0.01 to 0.5 µm, and preferably from 0.02 to 0.5 µm. The magnetic recording medium of the present invention may be either a disk-shaped medium having the non-magnetic layer and the magnetic layer provided on both surfaces of the support, or a tape-shaped or disk-shaped medium having the non-magnetic layer and the magnetic layer provided on only one surface thereof In this case, a back coat layer may be provided on the side opposite to the non-magnetic layer and the magnetic layer, in order to achieve effects of static prevention and curl correction. The thickness thereof is from 0.1 to 4 µm, and preferably from 0.3 to 2.0 µm. As the undercoat layer and the back coat layer, well-known ones can be used.

The thickness of the non-magnetic layer is usually from 0.2 to 5.0 µm, preferably from 0.3 to 3.0 µm, and more preferably from 1.0 to 2.5 µm. The non-magnetic layer exhibits its effect as long as it is substantially non-magnetic, so that the effect of the present invention is achieved, for example, even when a small amount of magnetic material is contained as impurities or intentionally. Needless to say, this is regarded as the substantially same constitution as that of the present invention. The term "substantially non-magnetic" as used herein indicates that the residual flux density is 0.01 T or less, or the coercive force is 7.96 kA/m (100 Oe) or less, and preferably that the non-magnetic layer has no residual flux density and no coercive force.

[Back Coat Layer]

In general, a magnetic tape for recording computer data strongly requires repetitive running properties, compared to a video tape and an audio tape. In order to maintain such high running durability, it is preferred that the back coat layer contains carbon black and an inorganic powder.

Two kinds of carbon blacks different in average particle size are preferably used in combination. In this case, fine granular carbon black having an average particle size of 10 to 20 nm and coarse granular carbon black having an average particle size of 230 to 300 nm are preferably used in combination. In general, addition of fine granular carbon black as described above allows surface electric resistance and light transmittance to be established low. In many magnetic recording apparatus, the light transmittance of a tape is used as an operation signal. In such a case, addition of the fine granular carbon black becomes particularly effective. Further, the fine granular carbon black is generally excellent in holding power of a liquid lubricant, and contributes to a reduction in the coefficient of friction when a lubricant is used in combination with it. On the other hand, the coarse granular carbon black having an average particle size of 230 to 300 nm has a function as a solid lubricant, and forms fine projections (i.e., fine protrusions) on a surface of the back layer to decrease a contact area, thereby contributing to a reduction in the coefficient of friction. However, the coarse granular carbon black has the disadvantage that the sole use thereof results in easy dropping out of the back coat layer by sliding of a tape in a severe running system, leading to an increase in the rate of errors.

Specific examples of commercial products of the fine granular carbon black include RAVEN 2000B (18 nm) and RAVEN 1500B (17 nm) manufactured by Colombia Carbon; BP800 (17 nm) manufactured by Cabot; PRINTEX 90 (14 nm), PRINTEX 95 (15 nm), PRINTEX 85 (16 nm) and PRINTEX 75 (17 nm) manufactured by Degussa; and #3950 (16 nm) manufactured by Mitsubishi Kasei Corp. The average particle size is indicated in parentheses.

Specific examples of commercial products of the coarse granular carbon black include Thermal Black (270 nm) manufactured by Cancarb Co., Ltd.; and RAVEN MTP (275 nm) manufactured by Colombia Carbon.

When two kinds of carbon blacks different in average particle size are used in the back coat layer, the content ratio of the fine granular carbon black having an average particle size of 10 to 20 nm to the coarse granular carbon black having an average particle size of 230 to 300 nm is preferably from 98:2 to 75:25, and more preferably from 95:5 to 85:15.

The content of the carbon black in the back coat layer (when two kinds are used, the total content thereof) is usually from 30 to 80 parts by weight, and preferably from 45 to 65 parts by weight.

As for the inorganic powder, it is preferred that two kinds of inorganic powders different in hardness are used. Specifically, a soft inorganic powder having a Mohs' hardness of 3 to 4.5 and a hard inorganic powder having a Mohs' hardness of 5 to 9 are preferably used. Addition of the soft inorganic powder having a Mohs' hardness of 3 to 4.5 can stabilize the coefficient of friction in repeated running. Moreover, the inorganic powder having a hardness within this range does not scrape a sliding guide pole. It is preferred that this inorganic powder has an average particle size ranging from 30 to 50 nm.

The soft inorganic powders having a Mohs' hardness of 3 to 4.5 include, for example, calcium sulfate, calcium carbonate, calcium silicate, barium sulfate, magnesium carbonate, zinc carbonate and zinc oxide. They can be used either alone or as a combination of two or more of them.

The content of the soft inorganic powder in the back coat layer is preferably within the range of from 10 to 140 parts by weight, and more preferably from 35 to 100 parts by weight, based on 100 parts by weight of carbon black.

Addition of the hard inorganic powder having a Mohs' hardness of 5 to 9 enhances the strength of the back coat layer and improves running durability. When this inorganic powder is used together with the carbon black and the soft inorganic powder, deterioration of the back coat layer in repeated sliding is reduced to give the strong back coat layer. Further, addition of this inorganic powder gives proper abrasive power to reduce adhesion of scratched powders to a tape guide pole. In particular, the combined use thereof with the soft inorganic powder can improve sliding characteristics to a guide pole having a rough surface, and stabilize the coefficient of friction of the back coat layer.

The average particle size of the hard inorganic powder is preferably within the range of from 80 to 250 nm (more preferably from 100 to 210 nm).

The hard inorganic powders having a Mohs' hardness of 5 to 9 include, for example, α-iron oxide, α-alumina and chromium oxide ($Cr_2O_3$). These powders may be used either alone or in combination. Of these, preferred are α-iron oxide and α-alumina. The content of the hard inorganic powder is preferably from 3 to 30 parts by weight, and more preferably from 3 to 20 parts by weight, based on 100 parts by weight of carbon black.

When the soft inorganic powder and the hard inorganic powder are used together in the back coat layer, they are preferably selected so that the difference in hardness between the soft inorganic powder and the hard inorganic powder is 2 or more (more preferably 2.5 or more, particularly 3 or more). It is preferred that the back coat layer contains above-described two kinds of inorganic powders each having the specific average particle size and different in Mohs' hardness, and the above-described two kinds of carbon blacks different in average particle size.

The back coat layer can contain a lubricant. The lubricant can be appropriately selected from the lubricants described above as those for the non-magnetic layer and the magnetic layer. The lubricant is added to the back coat layer usually in an amount of 1 to 5 parts by weight based on 100 parts by weight of binder.

[Support]

Although there is no particular limitation on the support used in the present invention, a substantially non-magnetic and flexible support is preferred.

The flexible supports used in the present invention include well-known films of polyesters such as polyethylene terephthalate and polyethylene naphthalate, polyolefins, cellulose triacetate, polycarbonates, aromatic polyamides, aliphatic polyamides, polyimides, polyamideimides, polysulfones and polybenzoxazole. High-strength supports such as polyethylene naphthalate and polyamide films are preferably used. In order to change the surface roughness of a magnetic surface from that of a base surface, a lamination type support as shown in Japanese Patent Application (Laid-Open) No. 224127/1991 can also be used. These supports may previously be subjected to corona discharge treatment, plasma treatment, treatment for making adhesion easy, heat treatment and dust removing treatment. It is also possible to use a aluminum or glass substrate as the support of the present invention.

In order to attain the object of the present invention, it is preferred that the central plane average surface roughness Ra (defined in JIS B 0601) of the support measured with a TOPO-3D instrument manufactured by WYKO is 8.0 nm or less, preferably 4.0 nm or less, and more preferably 2.0 nm or less. It is further preferred that the support has not only a small central plane average surface roughness, but also no large projections of 0.5 $\mu$m or more. The roughness and shape of a surface of the support are freely controlled by adjusting the size and amount of a filler added thereto as needed. Examples of such fillers include fine organic powders such as acrylic powders, as well as oxides and carbonates of Ca, Si and Ti. It is preferred that the support has a maximum height Rmax of 1 $\mu$m or less, an average roughness of ten measurements Rz of 0.5 $\mu$m or less, a center plane height Rp of 0.5 $\mu$m or less, a center plane depth Rv of 0.5 $\mu$m or less, a center plane area rate Sr of 10% to 90% and an average wavelength $\lambda$a of 5 to 300 $\mu$m. In order to obtain desired electromagnetic characteristics and durability, the distribution of surface projections of the support can be arbitrarily controlled with the filler, within the range of 0 to 2000 projections having a size of 0.01 to 1 $\mu$m, per 0.1 mm$^2$. The F-5 value of the support used in the present invention is preferably from 5 to 50 kg/mm$^2$ (from 49 to 490 MPa). The heat shrinkage rate of the support at 100° C. for 30 minutes is preferably 3% or less, and more preferably 1.5% or less, and the heat shrinkage rate at 80° C. for 30 minutes is preferably 1% or less, and more preferably 0.5% or less. The breaking strength is preferably from 5 to 100 kg/mm$^2$ (nearly equal to 49 to 980 MPa), and the modulus of elasticity is preferably from 100 to 2000 Kg/mm$^2$ (nearly equal to 0.98 to 19.6 GPa). The coefficient of thermal expansion is from $10^{-5}$ to $10^{-6}$/° C., and preferably from $10^{-4}$ to $10^{-8}$/° C. The coefficient of humidity expansion is $10^{-4}$/RH % or less, and preferably $10^{-5}$/RH % or less. It is preferred that these thermal characteristics, dimensional characteristics and mechanical strength characteristics in each direction in a plane are approximately equal within 10%.

[Production Process]

A process for producing a magnetic coating or a non-magnetic coating used in the magnetic recording medium of the present invention comprises at least a kneading step, a dispersing step and mixing steps which are provided before and/or after these steps as needed. Each step may be divided into two or more stages. All of the starting materials used in the present invention, such as the magnetic material, the non-magnetic powder, the binder, the carbon black, the abrasive, the antistatic agent and the solvent, may be added at the start of or in the course of any step. Each of the starting materials may be added in parts over two or more steps. For example, polyurethane can be incorporated in parts in the kneading step, the dispersing step and the mixing step for adjustment of viscosity after the dispersing step. In order to attain the object of the present invention, production techniques known in the art can be used as a part of the process. In the kneading step, a kneader having strong kneading ability such as an open kneader, a continuous kneader, a pressure kneader or an extruder is preferably used. When the kneader is used, the whole binder or a part thereof (preferably, 30% or more of the whole binder) is kneaded with the magnetic material or the non-magnetic powder within the range of 15 to 500 parts based on 100 parts of magnetic material. Details of such kneading treatment are described in Japanese Patent Application (Laid-Open) Nos. 106338/1989 and 79274/1989. Further, glass beads can be used for dispersing a solution for the magnetic layer and a solution for the non-magnetic layer. Zirconia beads, titania beads and steel beads, which are high-specific gravity dispersing media, are suitable. These dispersing media are optimized in particle size and filling rate to use them, and as a dispersing apparatus, there can be used one known in the art.

In the case of coating of the multiple layer magnetic recording medium of the present invention, the following systems are preferably used:

(1) A method of first forming the lower layer with a gravure coater, a roll coater, a blade coater or an extrusion coater which is generally used in application of a magnetic coating, and then forming the upper layer thereon while the lower layer is in a wet state, using a support pressure type extrusion coater disclosed in Japanese Patent Publication No. 46186/1989 and Japanese Patent Application (Laid-Open) Nos. 238179/1985 and 265672/1990;

(2) A method of almost simultaneously forming the upper layer and the lower layer by means of one coating head containing two slits for passing coating solutions as disclosed in Japanese Patent Application (Laid-Open) Nos. 88080/1988, 17971/1990 and 265672/1990; and (3) A method of almost simultaneously forming the upper layer and the lower layer using an extrusion coater with back-up rolls disclosed in Japanese Patent Application (Laid-Open) No. 174965/1990.

In order to prevent the electromagnetic characteristics of the magnetic recording medium from deteriorating due to coagulation of the magnetic particles, it is desirable to give shear to coating solutions in coating heads by methods described in Japanese Patent Application (Laid-Open) Nos. 95174/1987 and 236968/1989.

Further, the viscosity of the coating solution is required to satisfy the numerical value range disclosed in Japanese Patent Application (Laid-Open) No. 8471/1991. In order to achieve the multiple layer constitution, the successive multiple layer coating may be used, of course, in which the lower layer is applied and dried, and then the magnetic layer is provided thereon, and the effect of the present invention is not lost. However, in order to decrease coating defects and improve quality such as dropout, the above-described simultaneous multiple layer coating is preferably used.

For the disk, sufficiently isotropic orientation is obtained even when not oriented with an orientation apparatus, in some cases. However, it is desirable to use well-know random orientation apparatus such as the oblique alternate arrangement of cobalt magnets and application of alternating magnetic fields by use of solenoids. In the case of the fine ferromagnetic metal powder, it is preferred that the isotropic orientation is generally two-dimensionally random in a plane. However, it can be tree-dimensionally random, giving a perpendicular component. In the case of hexagonal ferrite, it is liable to become tree-dimensionally random in a plane and in a perpendicular direction. However, it is also possible to be two-dimensionally random in a plane. Further, isotropic magnetic characteristics can also be imparted in a circumferential direction by perpendicular orientation using well-known methods such as heteropolar opposed magnets. In particular, when high-density recording is carried out, perpendicular orientation is preferred. Circumference orientation may also be conducted using spin coating.

The magnetic tape is, in machine direction, oriented using cobalt magnets or solenoids. It is preferred that the temperature of drying air, the air flow and the coating speed are controlled, thereby adjusting the drying position of a coating film. It is preferred that the coating speed is 20 m/min to 1000 m/min and the temperature of the drying air is 60° C. or more. Before the tape enters a magnet zone, proper predrying can also be performed.

After the above-described coating and drying, calender treatment is usually applied to the magnetic recording medium. As rolls for calender treatment, there are used heat-resistant plastic rolls such as epoxy, polyimide, polyamide and polyimideamide resin rolls, or metal rolls. In particular, when the double-sided magnetic layers are formed, treatment with metal rolls is preferred the treating temperature is preferably 50° C. or more, and more preferably 100° C. or more. The line pressure is preferably 200 kg/cm (196 kN/m) or more, and more preferably 300 kg/cm (294 kN/m) or more.

[Physical Characteristics]

The saturation flux density of the magnetic layer of the magnetic recording medium according to the present invention is preferably from 0.1 to 0.3 T. Although the coercive force Hc of the magnetic layer is 159 kA/m (2000 Oe) or more, it is preferably from 159 kA/m (2000 Oe) to 398 kA/m (5000 Oe). It is preferred that the distribution of the coercive force is narrower, and the SFD is preferably 0.6 or less. When the orientation is two-dimensionally random, the squareness ratio is from 0.55 to 0.67, and preferably from 0.58 to 0.64. When the orientation is three-dimensionally random, the squareness ratio is preferably from 0.45 to 0.55. In the case of perpendicular orientation, the squareness ratio is 0.6 or more, and preferably 0.7 or more, in a perpendicular direction. When demagnetization field correction is carried out, the squareness ratio is 0.7 or more, and preferably 0.8 or more. In both the two-dimensionally random and three-dimensionally random cases, the orientation ratio is preferably 0.8 or more. In the two-dimensionally random case, the squareness ratio, Br and Hc in a perpendicular direction is preferably from 0.1 to 0.5 time those in an in-plane direction.

For the magnetic tape, the squareness ratio is 0.7 or more, and preferably 0.8 or more. The coefficient of friction of the magnetic recording medium of the present invention to ahead is 0.5 or less, and preferably 0.3 or less, at a temperature ranging from −10° C. to 40° C. and a humidity ranging from 0% to 95%. The surface intrinsic resistance of a magnetic surface is preferably from $10^{-4}$ to $10^{12}$ ohms/square, and the charge potential is preferably from −500 V to +500 V. The modulus of elasticity of the magnetic layer at an elongation of 0.5% is preferably from 100 to 2000 kg/mm$^2$ (from 0.98 to 19.6 GPa), in each direction in a plane, and the breaking strength is preferably from 10 to 70 kg/mm$^2$ (from 98 to 686 MPa). The modulus of elasticity of the magnetic recording medium is preferably from 100 to 1500 kg/mm$^2$ (from 0.98 to 14.7 GPa), in each direction in a plane, and the residual elongation is preferably 0.5% or less. The heat shrinkage rate at all temperatures of 1000° C. or less is preferably 1% or less, more preferably 0.5% or less, and still more preferably 0.1% or less. The glass transition temperature (the maximum point of the loss elastic modulus in measurement of the dynamic viscoelasticity at 110 Hz) of the magnetic layer is preferably from 50° C. to 120° C., and that of the lower non-magnetic layer is preferably from 0° C. to 100° C. The loss elastic modulus is preferably within the range of $1\times10^9$ to $8\times10^{10}$ μN/cm$^2$, and the loss tangent is preferably 0.2 or less. When the loss tangent is too high, an adhesion failure is liable to occur. It is preferred that these thermal characteristics and mechanical characteristics in each direction in a plane are approximately equal within 10%. The content of residual solvents contained in the magnetic layer is preferably 100 mg/m$^2$ or less, and more preferably 10 mg/m$^2$ or less. The percentage of pores in both the upper and lower layers is preferably 30% by volume or less, and more preferably 20% by volume or less. In order to attain a high output, it is preferred that the percentage of pores is low. However, it is sometimes better to secure a certain value depending on the purpose. For example, in disk media in which importance is given to repetition use, a higher percentage of pores provide better running durability in many cases.

The central plane average surface roughness Ra of the magnetic layer measured in an area of about 250 μm×250 μm with a TOPO-3D instrument manufactured by WYKO is 4.0 nm or less, preferably 3.8 nm or less, and more preferably 3.5 nm or less. It is preferred that the magnetic layer has a maximum height Rmax of 0.5 μm or less, an average roughness of ten measurements Rz of 0.3 μm or less, a center plane height Rp of 0.3 μm or less, a center plane depth Rv of 0.3 μm or less, a center plane area rate Sr of 20% to 80% and an average wavelength λa of 5 to 300 μm. The surface projections of the magnetic layer are preferably established as described above, thereby optimizing the electromagnetic characteristics and the coefficient of friction. These can be easily controlled by the control of surface properties of the support, and by the particle size and amount of the powder added to the magnetic layer and the shape of a surface of the roll for calender treatment as described above. The curl is preferably within ±3 mm.

When the magnetic recording medium of the present invention has the non-magnetic layer and the magnetic layer, it is easily conceivable to change the physical properties thereof for the non-magnetic layer and the magnetic layer depending on the purpose. For example, an increase in the modulus of elasticity of the magnetic layer improves running properties, whereas the modulus of elasticity of the non-magnetic layer lower than that of the magnetic layer improves contact of the magnetic recording medium with a head.

EXAMPLES

The present invention will be illustrated with reference to specific examples below, but it is to be understood that the present invention is not limited thereto.

<Ferromagnetic Powders>

Hexagonal ferrite magnetic powders used in examples are shown in the following Table 1.

TABLE 1

(Magnetic Barium Ferrite Powder)

| Kind | BaFe1 | BaFe2 | BaFe3 | BaFe4 | BaFe5 | BaFe6 | BaFe7 |
|---|---|---|---|---|---|---|---|
| Sorting by Centrifugal Separation | Conducted | Conducted | Conducted | Conducted | Conducted | Not conducted | Not conducted |
| Average Tabular diameter (nm) | 30 | 20 | 38 | 30 | 20 | 45 | 30 |
| Average Particle Volume (nm3) | 5800 | 2600 | 9400 | 5800 | 2600 | 13000 | 5800 |
| Existing Ratio of Particles Having a Tabular diameter of Less Than 10 nm (%) | 5 | 8.7 | 2 | 5 | 3 | 9.6 | 12 |

In Table 1, the reversal component max indicates the rate (%) of a component which performs magnetic flux revolution in a region of 80 kA/m (1000 Oe) in a differential curve of a remanence curve.

Further, in the sorting by centrifugal separation, "conducted" indicates that centrifugal separation treatment was conducted at 100,000 rpm for 10 minutes.

The particle size was determined by taking a photograph of particles at a magnification of 500,000 under a transmission electron microscope, and measuring the size of about 500 particles with an image analyzer.

Example 1

<Preparation of Coating>

| Magnetic Coating | |
|---|---|
| Magnetic Barium Ferrite Powder (BaFe1) | 100 parts |
| Vinyl Chloride Copolymer, MR-110 manufactured by Nippon Zeon Co., Ltd. | 10 parts |
| Polyurethane Resin, UR 8200 manufactured by Toyobo Co., Ltd. | 5 parts |
| α-Alumina, HIT-55 manufactured by Sumitomo Chemical Co., Ltd. Average particle size: 0.2 μm | 5 parts |
| Carbon Black, #55 manufactured by Asahi Carbon Co. Average particle size: 0.075 μm Specific surface area: 35 m²/g DBP oil absorption amount: 81 ml/100 g PH: 7.7 Volatile matter: 1.0% | 1 part |
| Butyl Stearate | 10 parts |
| Butoxyethyl Stearate | 5 parts |

| -continued | |
|---|---|
| Isohexadecyl Stearate | 3 parts |
| Stearic Acid | 2 parts |
| Methyl Ethyl Ketone | 125 parts |
| Cyclohexane | 125 parts |
| Non-Magnetic Coating | |
| Non-Magnetic Powder, Acicular Hematite Average length in the long axis: 0.15 μm Specific surface area measured by the BET method: 50 m²/g pH: 8.5 Surface treatment layer: Al₂O₃ | 80 parts |
| Carbon Black Average particle size: 20 nm | 20 parts |
| Vinyl Chloride Copolymer, MR-110 manufactured | 12 parts |

| -continued | |
|---|---|
| by Nippon Zeon Co., Ltd. | |
| Polyurethane Resin, UR8200 manufactured by Toyobo Co., Ltd. | 5 parts |
| Butyl Stearate | 1 part |
| Stearic Acid | 3 parts |
| Methyl Ethyl Ketone/Cyclohexanone (8/2 Mixed Solvent) | 250 parts |

<Production of Computer Tape>

For the above-described coatings, the respective components were kneaded with a continuous kneader, and then dispersed by using a sand mill for 4 hours. Then, 2.5 parts of a polyisocyanate was added to the resulting dispersion for a non-magnetic layer, and 3 parts of the polyisocyanate was added to the resulting dispersion for a magnetic layer. Further, 40 parts of cyclohexanone was added to each dispersion, followed by filtration using a filter having an average pore size of 1 μm to prepare coating solutions for forming the non-magnetic layer and the magnetic layer, respectively. The resulting coating solution for the non-magnetic layer was applied onto a 4.4 μm-thick aramid support having a central plane average surface roughness of 2 nm so as to form the lower layer having a thickness of 1.7 μm after drying. Immediately after that, the coating solution for the magnetic layer was simultaneously applied there to so as to form the magnetic layer having a thickness of 0.1 μm after drying (simultaneous multiple layer coating). Orienta tion was thereafter conducted by a cobalt magnet having a magnetic force of 0.6 T and a solenoid having a magnetic force of 0.6 T while both the layers were still in a wet state. After drying, calender treatment was conducted by using a seven-step calender constituted by metal rolls alone at a temperature of 85° C. at a rate of 200 m/minute. Then, a coating dispersion (100 parts of carbon black (average particle size: 17 nm), 80 parts of calcium carbonate (average particle size: 40 nm) and 5 parts of α-alumina (average particle size: 200 nm) were dispersed in a nitrocellulose resin, a polyurethane resin and a polyisocyanate) was applied thereto to form a back coat layer having a thickness of 0.5 μm. the resulting product was slit to a width of 8 mm, and attached to an apparatus equipped with delivery and take-up devices for the slit product so as to press the magnetic surface on a non-woven fabric and a razor blade. The surface of the magnetic layer was cleaned with a tape cleaning apparatus to obtain a tape sample.

The performances of the computer tape were evaluated by the following measuring methods:

(1) Magnetic Characteristics

Hc and σs: measured at an Hm of 796 kA/m (10 kOe) with a vibration sample type magnetometer (manufactured by Toei Kogyo o., Ltd.).

Remanence Curve: determined according to the above-described method.

Differential Curve of Remanence Curve: determined according to the above-described method.

(2) C/N Ratio

Measurement was made with a drum tester equipped with a recording head (MIG, gap: 0.15 μm, track width: 18 μm, 1.8 T) and an MR head for reproduction (shield type, gap between shields: 0.2 μm, track width: 4 μm). A single-frequency signal having a recording wavelength of 0.2 μm (50 MHz) was recorded at a head-media relative speed of 10 m/minute, and for a reproduction signal, frequency analysis was conducted with a spectrum analyzer manufactured by Shibasoku. The ratio of an output voltage of the above-described single-frequency signal to a noise voltage spaced 1 MHz apart was taken as C/N. In reproduction, bias current was applied to the MR head so as to give the maximum reproduction output.

(3) Overwrite Erasing Rate

Using the same measuring instrument as with the above-described C/N, a signal having a recording wavelength of 0.8 μm (12.5 MHz) was first recorded, and a signal having a recording wavelength of 0.2 μm (50 MHz) was then overwritten. The remaining rate of the signal having a wavelength of 0.8 μm at this time was taken as the overwrite erasing rate. It is generally required to be −20 dB or less.

Examples 2 to 5 and Comparative Examples 1 and 2

Tapes were prepared in the same manner as with Example with exception that the magnetic barium ferrite powder and e thickness of the magnetic layer were changed as shown in Table 2.

Example 2 is the case that the tabular diameter is small; ample 3 is the case that the tabular diameter is large; Example is the case that the magnetic layer is somewhat thick; and ample 5 is the case that the tabular diameter is small, the is high, and the magnetic layer is thin.

Results thereof are shown in Table 2.

TABLE 2

| | | Example 1 | Example 2 | Example 3 | Example 4 | Example 5 | Comparative Example 1 | Comparative Example 2 |
|---|---|---|---|---|---|---|---|---|
| Kind of Hexagonal Magnetic Ferrite Powder | | BaFe1 | BaFe2 | BaFe3 | BaFe4 | BaFe5 | BaFe6 | BaFe7 |
| Magnetic Layer | Hc[kA/m] | 191 | 186 | 188 | 191 | 280 | 135 | 185 |
| | Reversal Component max | 0.5 | 0.8 | 0.1 | 0.5 | 0.2 | 0.8 | 1.3 |
| | Thickness (μm) | 0.1 | 0.1 | 0.1 | 0.18 | 0.05 | 0.1 | 0.25 |
| Non-Magnetic Layer | | Provided | Provided | Provided | Provided | Provided | Provided | Provided |
| C/N Ratio | | 3.8 | 4.5 | 3.2 | 3.9 | 4.7 | 0.5 | 0.8 |
| Overwrite Erasing Rate | | −26 | −24 | −27 | −23 | −25 | −22 | −16 |

Comparative Example 1 is the case that the average tabular diameter is as large as 45 nm, and the reversal component max is decreased to less than 1.0% without sorting by centrifugal separation. However, sufficient C/N ratio is not obtained because of high noise.

Comparative Example 2 is the case that sorting by centrifugal separation is not applied to BaFe1 used in Example 1, that the existing ratio of particles having a tabular diameter of less than 10 nm is 12%, and that the magnetic layer is thick. Sufficient C/N ratio is not obtained because of high noise, and the overwrite erasing rate is insufficient.

All Examples show high C/N ratio and sufficient overwrite erasing rate, compared to Comparative Examples.

According to the present invention, there could be provided the coating type magnetic recording medium (i.e., the magnetic recording particulate medium) excellent in productivity, and remarkably improved in C/N ratio in a high-density recording region, in a recording reproduction system in which an MR head is combined.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having thereon a magnetic layer which mainly comprises a ferromagnetic powder and a binder, wherein the magnetic recording medium is used in a magnetic recording reproduction system in which a recording signal is reproduced with a magnetic resistance type head (MR head), the ferromagnetic powder is a hexagonal magnetic ferrite powder having an average tabular diameter of from 10 to 40 nm, the magnetic layer has a coercive force of 159 kA/m (2000 Oe) or more and has at most less than 1% of a component which performs magnetic flux revolution in a region of 80 kA/m (1000 Oe) or less in a differential curve of a remanence curve, the average particle volume of the hexagonal magnetic ferrite powder is from 1000 to 10000 $nm^3$, and the existing ratio of particles having a tabular diameter of less than 10 nm is 10% or less.

2. The magnetic recording medium as in claim 1, wherein the magnetic layer has a thickness of from 0.03 to 0.20 $\mu$m.

3. The magnetic recording medium as in claim 1, wherein a substantially non-magnetic layer is provided between the magnetic layer and the support.

* * * * *